(12) United States Patent
Park et al.

(10) Patent No.: US 11,789,180 B1
(45) Date of Patent: Oct. 17, 2023

(54) APPARATUS FOR METEOROLOGICAL OBSERVATION

(71) Applicant: NATIONAL INSTITUTE OF METEOROLOGICAL SCIENCES, Seogwipo-si (KR)

(72) Inventors: Mi Eun Park, Gangneung-si (KR); Yong Hee Lee, Seoul (KR)

(73) Assignee: NATIONAL INSTITUTE OF METEOROLOGICAL SCIENCES, Seogwipo-si (KR)

( * ) Notice: Subject to any disclaimer, the term of this patent is extended or adjusted under 35 U.S.C. 154(b) by 0 days.

(21) Appl. No.: 18/202,701

(22) Filed: May 26, 2023

(30) Foreign Application Priority Data

Aug. 10, 2022 (KR) .......................... 10-2022-0100210

(51) Int. Cl.
    *G01W 1/06* (2006.01)
(52) U.S. Cl.
    CPC .......... *G01W 1/06* (2013.01); *G01W 2203/00* (2013.01)
(58) Field of Classification Search
    None
    See application file for complete search history.

(56) References Cited

U.S. PATENT DOCUMENTS 7,184,896 B1 * 2/2007 Benson .................... G01V 9/00
                                                    342/28

FOREIGN PATENT DOCUMENTS

| CN | 202119930 U |   | 1/2012 |
|----|-------------|---|--------|
| CN | 103942941 A | * | 7/2014 |
| CN | 203786891 U | * | 8/2014 |
| CN | 208044099 U | * | 11/2018 |
| CN | 110095826 A | * | 8/2019 |

OTHER PUBLICATIONS

CN 202119930 U, translation (Year: 2012).*
CN 103942941 A, translation (Year: 2014).*
CN 110095826 A, translation (Year: 2019).*
CN 203786891 U, translation (Year: 2014).*
CN 208044099 U, translation (Year: 2018).*

(Continued)

*Primary Examiner* — Lina Cordero
(74) *Attorney, Agent, or Firm* — Maschoff Brennan

(57) ABSTRACT

In accordance with one aspect of the present disclosure, there is provided an apparatus for meteorological observation, including: a prop; a meteorological sensor, mounted on the prop, configured to measure at least wind direction information; a level configured to maintain a horizon of the prop; a first GPS, mounted on a first area of the prop, configured to acquire first longitudinal information and first latitudinal information; a second GPS, mounted on a second area of the prop, configured to acquire second longitudinal information and second latitudinal information, wherein the second area is separated from the first area by a predetermined distance; a processor configured to calibrate the wind direction information and thus output adjusted wind direction information by referring to a location of the first area, a location of the second area, the first latitudinal information, the first longitudinal information, the second latitudinal information and the second longitudinal information.

8 Claims, 5 Drawing Sheets

100

(56) References Cited

OTHER PUBLICATIONS

Wellbian System Co., "Meteorological sensor vehicle mounting and calibration technology development," The Small and Medium Business Administration, (Apr. 30, 2014).
KR Office Action dated Oct. 13, 2022 as received in Application No. 10-2022-0100210.
KR Decision to Grant dated Feb. 14, 2023 as received in Application No. 10-2022-0100210.

* cited by examiner

APPARATUS FOR METEOROLOGICAL OBSERVATION

FIELD OF THE DISCLOSURE

The present disclosure relates to a portable apparatus for meteorological observation.

BACKGROUND OF THE DISCLOSURE

Recently, occurrence of large forest fire is increasing worldwide each year. It is necessary to acquire meteorological information such as wind direction, wind speed, air temperature, humidity, atmospheric pressure of a location of the forest fire in order to promptly control an initial state of the forest fire before it develops to the large forest fire.

To acquire such meteorological information, in the past, vehicles for meteorological observation were provided to the location of the forest fire at the request of the Korea Forest Service. However, in order to operate the vehicles for meteorological observation, trained meteorological professionals are necessary, and the number of available vehicles for meteorological observation and the number of the trained meteorological professionals are very insufficient, and thus there is a difficulty in supporting. In addition, there is a risk of the spread of the forest fire until the vehicles for meteorological observation arrive at the location of the forest fire.

Therefore, it is necessary to invent an apparatus for meteorological observation that can be easily used even without the trained meteorological professionals and can be carried and installed without a separate support required for the apparatus for meteorological observation.

SUMMARY OF THE DISCLOSURE

It is an object of the present disclosure to solve all the aforementioned problems.

It is another object of the present disclosure to provide a portable apparatus for meteorological observation which allows meteorological observation information to be acquired even without professionals in emergency site or confined site.

It is still another object of the present disclosure to acquire accurate wind direction information regardless of the installed direction or the introduced direction of the apparatus for meteorological observation.

In accordance with one aspect of the present disclosure, there is provided an apparatus for meteorological observation, including: a prop; a meteorological sensor, mounted on the prop, configured to measure at least wind direction information; a level configured to maintain a horizon of the prop; a first GPS, mounted on a first area of the prop, configured to acquire first longitudinal information and first latitudinal information; a second GPS, mounted on a second area of the prop, configured to acquire second longitudinal information and second latitudinal information, wherein the second area is separated from the first area by a predetermined distance; a processor configured to calibrate the wind direction information and thus output adjusted wind direction information by referring to a location of the first area, a location of the second area, the first latitudinal information, the first longitudinal information, the second latitudinal information and the second longitudinal information.

As one example, there is provided the apparatus, wherein the processor is configured to calibrate the wind direction information to generate the adjusted wind direction information by referring to a difference between a true north direction and a GPS heading angle, wherein the GPS heading angle is an angle of a direction orthogonal to a straight line connecting a center of the first area and a center of the second area.

As one example, there is provided the apparatus, wherein the processor is configured to calculate the GPS heading angle by using at least two pieces of information among (i) a difference between the first latitudinal information and the second latitudinal information respectively acquired from the first GPS and the second GPS, (ii) a difference between the first longitudinal information and the second longitudinal information respectively acquired from the first GPS and the second GPS, and (iii) a measured distance between the center of the first area and the center of the second area.

As one example, there is provided the apparatus, wherein the processor is configured to calculate a latitudinal-directional unit distance corresponding to 1 degree of latitude by dividing a circumference of the Earth by 360, and then calculate a latitudinal-directional separation distance by referring to a difference between the first latitudinal information and the second latitudinal information and the latitudinal-directional unit distance, and wherein the processor is configured to calculate a longitudinal-directional unit distance corresponding to 1 degree of longitude at a specific latitude corresponding to a middle spot between the center of the first area and the center of the second area by referring to a value acquired by dividing a multiplication of cosine of A and the circumference of the Earth by 360, wherein said A represents an average value of the first latitudinal information and the second latitudinal information, and then is configured to calculate a longitudinal-directional separation distance by referring to a difference between the first longitudinal information and the second longitudinal information and the longitudinal-directional unit distance.

As one example, there is provided the apparatus, wherein the processor is configured to calculate a spot where north latitude becomes 90 degrees and thus acquires the true north direction by referring to the first latitudinal information, the second latitudinal information, the first longitudinal information and the second longitudinal information.

As one example, there is provided the apparatus, further including: an adsorption member configured to fix the prop to a vehicle.

As one example, there is provided the apparatus, further including: supporting members capable of adjusting lengths of a plurality of legs, wherein the supporting members comprise fixing members configured to fix the prop horizontally in a sloped terrain.

As one example, there is provided the apparatus, further including: a holder, installed with each of connecting members of each of predetermined regions of the plurality of legs, and configured to hold a data logger.

As one example, there is provided the apparatus, wherein the data logger is configured to perform at least part of storage, display and transmission by receiving the adjusted wind direction information from the processor.

As one example, there is provided the apparatus, further including: a cabinet capable of keeping the prop, the meteorological sensor, the level, the first GPS, the second GPS, and the processor.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
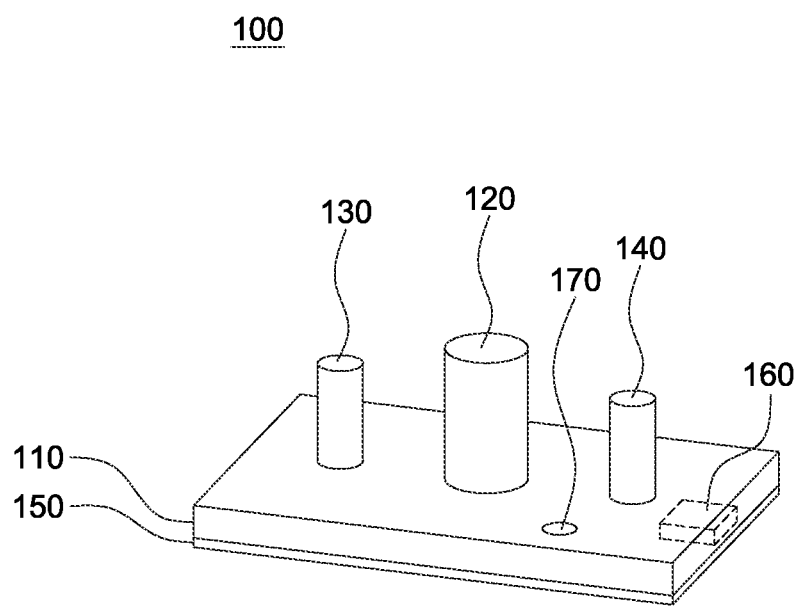
FIG. 1 is a drawing schematically illustrating a configuration of a portable apparatus for meteorological observation in accordance with one example embodiment of the present disclosure.

The following detailed description of the present disclosure refers to the accompanying drawings, which show by way of illustration a specific embodiment in which the present disclosure may be practiced, in order to clarify the objects, technical solutions and advantages of the present disclosure. These embodiments are described in sufficient detail to enable those skilled in the art to practice the present disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Furthermore, the present invention includes all possible combinations of embodiments indicated in the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to carry out the present disclosure easily, the example embodiments of the present disclosure will be explained by referring to attached diagrams in detail as shown below.

FIG. 1 is a drawing schematically illustrating a configuration of a portable apparatus 100 for meteorological observation in accordance with one example embodiment of the present disclosure.

By referring to FIG. 1, the portable apparatus 100 for meteorological observation includes a prop 110, a meteorological sensor 120, a first GPS 130, a second GPS 140, a processor 160 and a level 170. An adsorption member 150 may be installed on a lower face of the prop 110 of the portable apparatus 100 for meteorological observation. The portable apparatus 100 for meteorological observation may mean a separate apparatus distinguished from the adsorption member 150, but it is not limited thereto.

Herein, the meteorological sensor 120 essentially includes a wind direction sensor capable of acquiring wind direction information by being mounted on the prop 110, and depending on the case, may further include other sensors configured as either detachable sensors or integrated sensors.

Next, the first GPS 130, mounted on a first area of the prop 110, may acquire first longitudinal information and first latitudinal information, and the second GPS 140, mounted on a second area of the prop 110, may acquire second longitudinal information and second latitudinal information. Herein the second GPS 140 is separated from the first GPS 130 by a predetermined distance.

Next, the processor 160 is configured to calibrate the wind direction information and thus output adjusted wind direction information by referring to the first latitudinal information, the first longitudinal information, the second latitudinal information and the second longitudinal information from the first GPS 130 and the second GPS 140. Processes of calculating the adjusted wind direction information by the processor 160 shall be explained further in detail by referring to FIG. 4. In FIG. 1, the processor 160 is illustrated by dotted lines in a form of a cuboid located in an inner space of the prop 110, but the location and the form of the processor 160 are not limited thereto.

Next, the level 170, mounted on the prop 110, is configured to maintain a horizon of the prop 110, the meteorological sensor 120, the first GPS 130 and the second GPS 140. In FIG. 1, the level 170 is illustrated in a form of an oval mounted on a right side of the prop 110, but the location and the form of the level 170 are not limited thereto.

Next, the adsorption member 150 may be fixed to a vehicle and may be made of materials such as magnets, etc. In FIG. 1, the adsorption member 150 is illustrated as a quadrilateral plate attached to a lower end of the prop 110, but the form and the size of the adsorption member 150 are not limited thereto.

Figure 2:
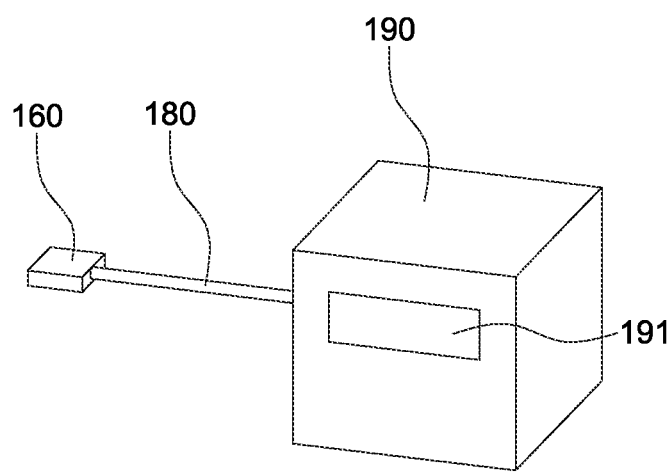
FIG. 2 is a drawing schematically illustrating a configuration for data processing of the portable apparatus for meteorological observation in accordance with one example embodiment of the present disclosure.

FIG. 2 is a drawing schematically illustrating a configuration for data processing of the portable apparatus 100 for meteorological observation in accordance with one example embodiment of the present disclosure.

By referring to FIG. 2, the processor 160 of the portable apparatus 100 for meteorological observation may store, display and/or transmit various data in connection with a data logger 190 through a cable 180. Specifically, the adjusted wind direction information calculated by the processor 160 and the meteorological information acquired from the meteorological sensor 120 can be stored in an internal storage device (not shown) of the data logger 190, and the various data can be displayed in real-time through a data display unit 191, and the various data can be transmitted in real-time to a computing device capable of telecommunication. Additionally, the various data can be transmitted to the data logger 190 and/or an external computing device capable of telecommunication even without the cable 180 by installing a Bluetooth transmitter, etc.

Figure 3:
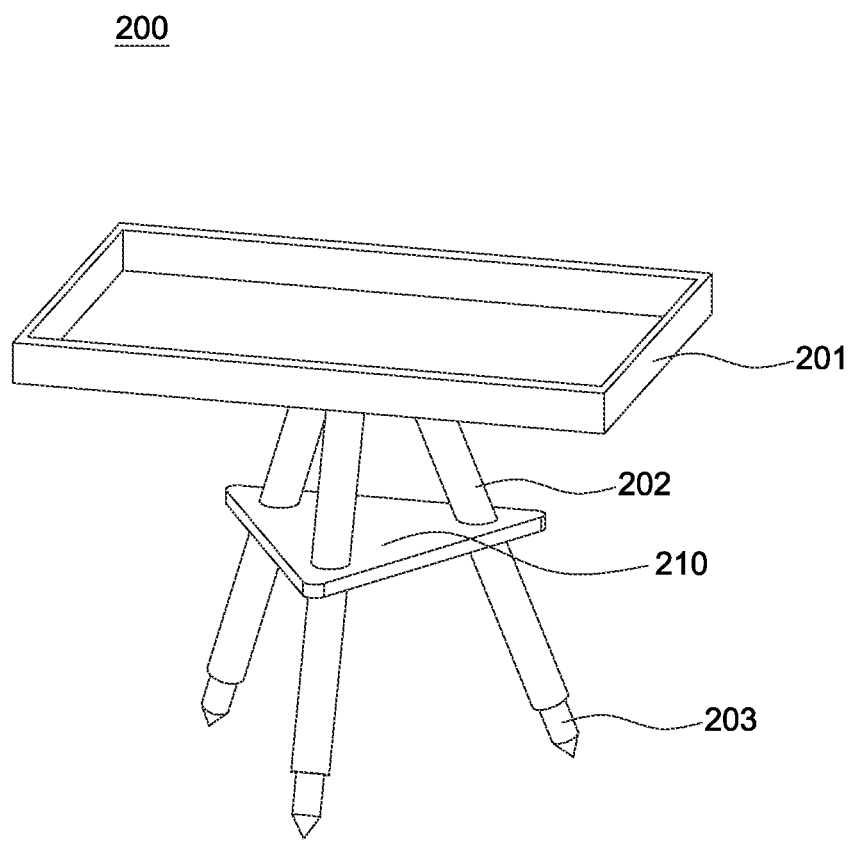
FIG. 3 is a drawing schematically illustrating supporting members of the portable apparatus for meteorological observation in accordance with one example embodiment of the present disclosure.

FIG. 3 is a drawing schematically illustrating supporting member 200 of the portable apparatus 100 for meteorological observation in accordance with one example embodiment of the present disclosure. The portable apparatus 100 for meteorological observation can be combined with the supporting member 200, and depending on the case, the portable apparatus 100 for meteorological observation may be considered to include the supporting member 200.

By referring to FIG. 3, the supporting member 200 includes a fixing unit 201 capable of fixing the prop 110, and includes a plurality of legs 202 capable of adjusting lengths thereof, each of which includes each of ground-fixing units 203 in a pointed-form. Additionally, a holder 210 capable of holding the data logger 190 may be installed by using some engaging parts, e.g., middle parts, of the legs 202. In FIG. 3, the fixing unit 201 is illustrated in a form fixing the prop 110 by supporting a lower portion of the prop 110, and the legs 202 are illustrated as three in number, but the form of the fixing unit 201 and the number of the legs 202 are not limited thereto. Likewise, in FIG. 3, the holder 210 is illustrated as a plate in a triangular form engaged with the three legs 202, but the material and the form of the holder 210 are not limited thereto.

Meanwhile, a portability of the apparatus 100 can be made much easier by using a cabinet of an appropriate size or a bag in a form of a carrier with a wheel and a handle to carry all components of the present invention including the prop 110, the meteorological sensor 120, the level 170, the first GPS 130, the second GPS 140 and the processor 160.

Figure 4:
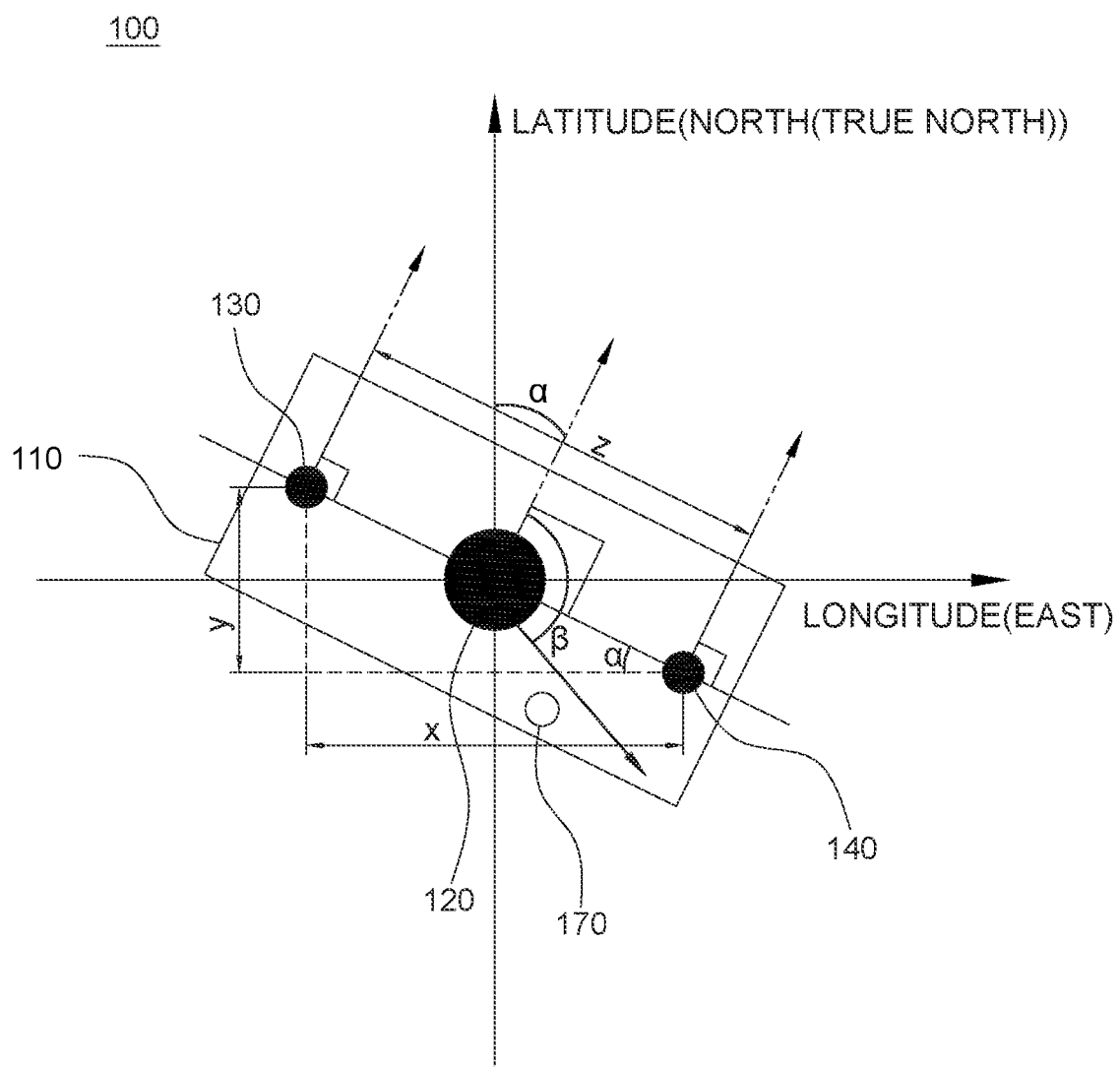
FIG. 4 is a drawing schematically illustrating a method for calculating adjusted wind direction information of the portable apparatus for meteorological observation in accordance with one example embodiment of the present disclosure.

FIG. 4 is a drawing schematically illustrating a method for calculating the adjusted wind direction information of the portable apparatus 100 for meteorological observation in accordance with one example embodiment of the present disclosure.

By referring to FIG. 4, if it is assumed that a is a difference in angle between the true north direction and a GPS heading angle and p is the wind direction information measured by the meteorological sensor 120, the adjusted wind direction information calculated by the processor 160 becomes α+β. Herein, the GPS heading angle is an angle of a direction orthogonal to a straight line connecting a center of the first area and a center of the second area on which the first GPS 130 and the second GPS 140 are located. Further, the GPS heading angle is an angle the meteorological sensor 120 measures as 0 degree. If α+β exceeds 360 degrees, the adjusted wind direction information is calculated by subtracting 360 from α+β. The true north direction is acquired by calculating the spot of 90 degrees north latitude by using the first latitudinal information, the second latitudinal information, the first longitudinal information and the second longitudinal information.

Herein, a can be acquired by using a trigonometric function. If it is assumed that a measured distance between the first GPS 130 and the second GPS 140 is z and that a latitudinal-directional separation distance calculated by referring to a difference between the first latitudinal information of the first GPS 130 and the second latitudinal information of the second GPS 140 is y, a value of sin(α) corresponds to a value of y/z. Accordingly, through $$\sin^{-1}\frac{y}{z},$$

the GPS heading angle α can be obtained. Likewise, if it is assumed that the longitudinal-directional separation distance calculated by referring to a difference between the first longitudinal information of the first GPS 130 and the second longitudinal information and the longitudinal-directional unit distance of the second GPS 140 is x, α can be obtained by $$\cos^{-1}\frac{x}{z},$$

and can also be obtained through $$\tan^{-1}\frac{y}{x}.$$

The latitudinal-directional separation distance y can be obtained by multiplying a latitudinal difference between the latitude of the first GPS 130 and the latitude of the second GPS by a latitudinal-directional unit distance. Herein, the latitudinal-directional unit distance corresponds to 1 degree of latitude by dividing a circumference of the Earth by 360.

y: latitudinal-directional separation distance (km)

$y=|[\text{latitude of the first GPS(in degree)}]-[\text{latitude of the second GPS(in degree)}]|\times b$ b: distance corresponding to 1 degree of latitude (in km)

$b=2\times\pi\times R/360$

R=radius of the Earth=6378.135 km

The longitudinal-directional separation distance x is obtained by multiplying a longitudinal difference between the longitude of the first GPS 130 and the longitude of the second GPS 140 by a longitudinal-directional unit distance corresponding to 1 degree of longitude at a specific latitude corresponding to a middle spot between the center of the first area and the center of the second area.

x: longitudinal-directional separation distance(in km)

$x:=|[\text{longitude of the first GPS(in degree)}]-[\text{longitude of the second GPS(in degree)}]|\times a$ a: distance corresponding to 1 degree of longitude(in km)

$a=\cos(([\text{latitude of GPS1(in degree)}]+[\text{latitude of GPS2(in degree)}])/2)\times 2\times\pi\times R/360$ NOTE: To calculate the value related to the longitude, "latitude" is used, and the detailed explanation thereon shall be given by referring to FIG. 5.

Figure 5:
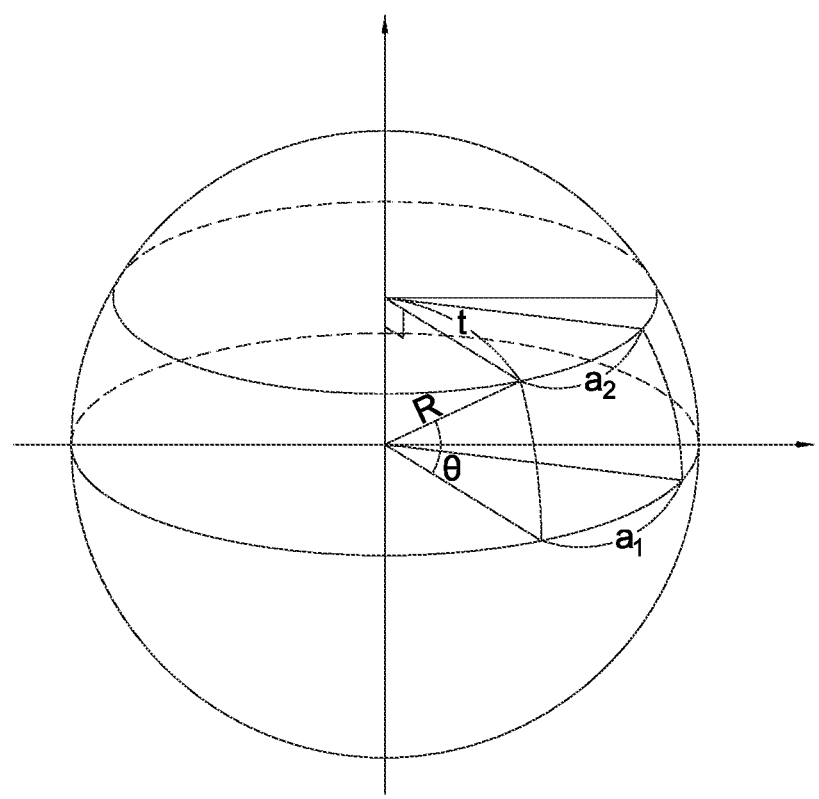
FIG. 5 is a drawing schematically illustrating a method for calculating a longitudinal-directional unit distance.

FIG. 5 is a drawing schematically illustrating a method for calculating a longitudinal-directional unit distance.

By referring to FIG. 5, a circumference of the Earth according to a latitude decreases as the latitude increases. That is, the longitudinal-directional unit distance a1 at 0 degree of latitude is greater than the longitudinal-directional unit distance a2 at θ degree of latitude. Accordingly, it is more accurate to calculate the longitudinal-directional unit distance by applying the latitude thereto such that the longitudinal-directional unit distance corresponds to the circumference of the Earth that varies according to the difference of the latitude. Accordingly, in order to apply 2πt instead of 2πR as the value of the circumference of the Earth, cosine of "latitude of the portable apparatus 100" is multiplied by the circumference of the Earth at 0 degree of latitude. Then, the longitudinal-directional unit distance is calculated by dividing 2πt by 360. The latitude of the portable apparatus 100 for meteorological observation is the average value of the latitude of the first GPS 130 and the latitude of the second GPS 140.

The present disclosure has an effect of providing the portable apparatus for meteorological observation which allows the meteorological observation information to be acquired even without professionals in emergency site or confined site.

The present disclosure has another effect of acquiring accurate wind directional information regardless of the installed direction or the introduced direction of the apparatus for meteorological observation.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. An apparatus for meteorological observation, comprising:
    a prop;
    a meteorological sensor, mounted on the prop, configured to measure at least wind direction information;
    a level configured to maintain a horizon of the prop;
    a first GPS, mounted on a first area of the prop, configured to acquire first longitudinal information and first latitudinal information;
    a second GPS, mounted on a second area of the prop, configured to acquire second longitudinal information and second latitudinal information, wherein the second area is separated from the first area by a predetermined distance;
    a processor configured to calibrate the wind direction information and thus output adjusted wind direction information by referring to a location of the first area, a location of the second area, the first latitudinal information, the first longitudinal information, the second latitudinal information and the second longitudinal information,
    wherein the processor is configured to calibrate the wind direction information to generate the adjusted wind direction information by referring to a difference between a true north direction and a GPS heading angle, wherein the GPS heading angle is an angle of a direction orthogonal to a straight line connecting a center of the first area and a center of the second area, and
    wherein the processor is configured to calculate the GPS heading angle by using at least two pieces of information among (i) a difference between the first latitudinal information and the second latitudinal information respectively acquired from the first GPS and the second GPS, (ii) a difference between the first longitudinal information and the second longitudinal information respectively acquired from the first GPS and the second GPS, and (iii) a measured distance between the center of the first area and the center of the second area.

2. The apparatus for meteorological observation of claim 1, wherein the processor is configured to calculate a latitudinal-directional unit distance corresponding to 1 degree of latitude by dividing a circumference of Earth by 360, and then calculate a latitudinal-directional separation distance by referring to the difference between the first latitudinal information and the second latitudinal information and the latitudinal-directional unit distance, and
    wherein the processor is configured to calculate a longitudinal-directional unit distance corresponding to 1 degree of longitude at a specific latitude corresponding to a middle spot between the center of the first area and the center of the second area by referring to a value acquired by dividing a multiplication of cosine of A and the circumference of the Earth by 360, wherein said A represents an average value of the first latitudinal information and the second latitudinal information, and then is configured to calculate a longitudinal-directional separation distance by referring to the difference between the first longitudinal information and the second longitudinal information and the longitudinal-directional unit distance.

3. The apparatus for meteorological observation of claim 1, wherein the processor is configured to calculate a spot where north latitude becomes 90 degrees and thus acquires the true north direction by referring to the first latitudinal information, the second latitudinal information, the first longitudinal information and the second longitudinal information.

4. The apparatus for meteorological observation of claim 1, further comprising: an adsorption member configured to fix the prop to a vehicle.

5. The apparatus for meteorological observation of claim 1, further comprising: supporting members capable of adjusting lengths of a plurality of legs, wherein the supporting members comprise fixing members configured to fix the prop horizontally in a sloped terrain.

6. The apparatus for meteorological observation of claim 5, further comprising: a holder, installed with each of connecting members of each of predetermined regions of the plurality of legs, and configured to hold a data logger.

7. The apparatus for meteorological observation of claim 6, wherein the data logger is configured to perform at least part of storage, display and transmission by receiving the adjusted wind direction information from the processor.

8. The apparatus for meteorological observation of claim 1, further comprising: a cabinet capable of keeping the prop, the meteorological sensor, the level, the first GPS, the second GPS, and the processor.

* * * * *